United States Patent [19]
Howell et al.

[11] Patent Number: 5,804,244
[45] Date of Patent: Sep. 8, 1998

[54] SPICY HOT CORN AND METHOD OF MAKING

[76] Inventors: Donald W. Howell; Vera Z. Howell, both of 14000 Greenview, Detroit, Mich. 48223

[21] Appl. No.: 911,095

[22] Filed: Aug. 14, 1997

[51] Int. Cl.⁶ .................................................... A23L 1/18
[52] U.S. Cl. ............................ 426/618; 426/93; 426/98; 426/293; 426/296; 426/302; 426/303
[58] Field of Search ................................ 426/93, 98, 302, 426/303, 293, 296, 618

[56] References Cited

U.S. PATENT DOCUMENTS 5,132,125  7/1992  Lew et al. .................................. 426/93
5,688,543  11/1997 Freeport et al. ........................... 426/93

*Primary Examiner*—Helen Pratt

[57] ABSTRACT

A new SPICY HOT CORN for providing a snack food. The inventive device includes red peppers, vinegar, salt garlic and chili powder cook with corn kernels to form a popcorn with a zesty flavor.

4 Claims, No Drawings

SPICY HOT CORN AND METHOD OF MAKING

BACKGROUND OF THE INVENTION

1. Field of the Invention

The present invention relates to COATING POPCORN and more particularly pertains to a new SPICY HOT CORN for providing a spicy and zesty flavor popcorn for consumption that can be prepared on the stove or in a microwave.

2. Description of the Prior Art

The use of COATING POPCORN is known in the prior art. More specifically, COATING POPCORN heretofore devised and utilized are known to consist basically of familiar, expected and obvious structural configurations, notwithstanding the myriad of designs encompassed by the crowded prior art which have been developed for the fulfillment of countless objectives and requirements.

In these respects, the SPICY HOT CORN according to the present invention substantially departs from the conventional concepts of the prior art, and in so doing provides an apparatus primarily developed for the purpose of providing a spicy and zesty flavor popcorn for consumption that can be prepared on the stove or in a microwave.

SUMMARY OF THE INVENTION

In view of the foregoing disadvantages inherent in the known types of COATING POPCORN now present in the prior art, the present invention provides a new SPICY HOT CORN construction wherein the same can be utilized for providing a spicy and zesty flavor popcorn for consumption that can be prepared on the stove or in a microwave.

The general purpose of the present invention, which will be described subsequently in greater detail, is to provide a new SPICY HOT CORN apparatus and method which has many of the advantages of the COATING POPCORN mentioned heretofore and many novel features that result in a new SPICY HOT CORN which is not anticipated, rendered obvious, suggested, or even implied by any of the prior art COATING POPCORN, either alone or in any combination thereof.

To attain this, the present invention generally comprises red peppers, vinegar, salt, garlic and chili powder cooked with corn kernels to form a popcorn with a zesty flavor.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new SPICY HOT CORN preparation method which has many of the advantages of the COATING POPCORN mentioned heretofore and many novel features that result in a new SPICY HOT CORN which is not anticipated, rendered obvious, suggested, or even implied by any of the prior art COATING POPCORN, either alone or in any combination thereof.

It is another object of the present invention to provide a new SPICY HOT CORN which may be easily and efficiently manufactured and marketed.

It is a further object of the present invention to provide a new SPICY HOT CORN which is of a durable and reliable construction.

An even further object of the present invention is to provide a new SPICY HOT CORN which is susceptible of a low cost of manufacture with regard to both materials and labor, and which accordingly is then susceptible of low prices of sale to the consuming public, thereby making such SPICY HOT CORN economically available to the buying public.

Still yet another object of the present invention is to provide a new SPICY HOT CORN which provides in the apparatuses and methods of the prior art some of the advantages thereof, while simultaneously overcoming some of the disadvantages normally associated therewith.

Still another object of the present invention is to provide a new SPICY HOT CORN for providing a spicy and zesty flavor popcorn for consumption that can be prepared on the stove or in a microwave.

Yet another object of the present invention is to provide a new SPICY HOT CORN which includes red peppers, vinegar, salt, garlic and chili powder cooked with corn kernels to form a popcorn with a zesty flavor.

Still yet another object of the present invention is to provide a new SPICY HOT CORN that is a durable and stable mixture.

Even still another object of the present invention is to provide a new SPICY HOT CORN that provides a new snack in the popcorn line of snack products the is susceptible of a low cost of producing.

These together with other objects of the invention, along with the various features of novelty which characterize the invention, are pointed out with particularity in the claims annexed to and forming a part of this disclosure.

DESCRIPTION OF THE PREFERRED EMBODIMENT

The present invention, SPICY HOT CORN and process for making same is comprised of a mixture of specific ingredients. such ingredients in their broadest context include red pepper, vinegar salt garlic and chili powder.

Such ingredients possess properties different from, or in addition to those possessed by the several ingredients in common and cooperate with respect to each other so as to attain the desired objective.

Specifically, the present invention SPICY HOT CORN comprises corn kernels, red peppers, salt, vinegar, garlic and chili powder. The corn kernels are chosen for their ability to become popcorn when heated. The popcorn is made spicy and zesty by the coating.

The coating is a blend of a pureed red pepper in an amount of about forty percent by weight; vinegar in an amount of about fifty to fifty-five percent by weight; garlic powder in an amount of about one to five percent by weight; and chili powder in an amount of about one to five percent by weight. The blend is cooked to form a sauce like material. The coating may be cooked onto the corn or it may be freeze dried. When the coating is freeze dried it can be formed into a powder that can be sprinkled onto the popcorn after cooking. Also, the coating when in a powdered from can be packaged for coating the corn during the cooking process in a microwave.

The spicy hot corn can be formulated with or without salt and an ingredient. If salt is included it is added in an among of about one to five percent by weight of the coating blend.

Furthermore, the SPICY HOT CORN is produced first by chopping a quantity of red peppers into a plurality of medium pieces. Once the red peppers are chopped the red pepper pieces are placed into a blender for pureeing. The pureed red peppers are poured into a container that can be heated. Vinegar is poured into the container with the pureed red peppers. Before any heating can occur, the other ingredients must be added.

An amount of garlic powder and chili powder is added into the container with the vinegar and pureed red peppers to form a coating mixture. The coating mixture is then heated to create a uniform sauce-like mixture. An amount of oil is added to the mixture for the purpose of cooking the corn kernel helping the sauce to stick to the popped corn. Finally, the corn kernels are added into the container with the coating mixture and oil, and heating the corn kernel until they pop.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A spicy hot, unpopped corn kernel composition consisting essentially of:

unpopped corn kernels;

a pureed red pepper in an amount of about forty percent by weight;

vinegar in an amount of about fifty to fifty-five percent by weight;

garlic powder in an amount of about one to five percent by weight; and chili powder in an amount of about one to five percent by weight.

2. The spicy hot unpopped corn kernel composition as set forth in claim 1, further including salt in an amount of about one to five percent by weight.

3. A method of producing a spicy hot popped corn by preparing a coating mixture for mixing with unpopped corn kernels, said method comprising the steps of:

chopping a quantity of red peppers into a plurality of medium size pieces, said quantity of red peppers being about forty percent by weight of the coating mixture;

placing the red pepper pieces into a blender for pureeing;

pouring the pureed red peppers into a container that can be heated;

pouring an amount of vinegar into the container with the pureed red peppers, said amount of vinegar being about fifty to fifty-five percent by weight of the coating mixture;

sprinkling an amount of garlic powder into the container with the vinegar and pureed red peppers, said amount of garlic powder being about 1 to five percent by weight of the coating mixture;

sprinkling an amount of chili powder into the container with the garlic powder, vinegar and pureed red peppers to form a coating mixture, said amount of chili powder being about 1 to 5 percent by weight of the coating mixture;

heating the coating mixture for creating a uniform sauce-like mixture;

adding oil to the coating mixture; and adding unpopped corn kernels into the container with the coating mixture and oil, and heating the unpopped corn kernels until they pop.

4. A method of producing a spicy hot popped corn by preparing a coating mixture for mixing with unpopped corn kernels, said method comprising the steps of:

chopping red peppers into a plurality of medium size pieces;

placing the red pepper pieces into a blender for pureeing;

pouring the pureed red peppers into a container that can be heated;

pouring vinegar into the container with the pureed red peppers;

sprinkling garlic powder into the container with the vinegar and pureed red peppers;

sprinkling an amount of chili powder into the container with the garlic powder, vinegar and pureed red peppers to form a coating mixture;

heating the coating mixture for creating a uniform sauce-like mixture;

adding oil to the coating mixture; and adding unpopped corn kernels into the container with the coating mixture and oil, and heating the unpopped corn kernels until they pop.

* * * * *